(12) United States Patent
Junk et al.

(10) Patent No.: US 7,947,770 B2
(45) Date of Patent: May 24, 2011

(54) FLAME RETARDANT POLYCARBONATE COMPOSITIONS

(75) Inventors: Christopher P. Junk, Wilmington, DE (US); Donald Douglas May, Chadds Ford, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 334 days.

(21) Appl. No.: 12/038,870

(22) Filed: Feb. 28, 2008

(65) Prior Publication Data

US 2008/0221241 A1    Sep. 11, 2008

Related U.S. Application Data

(60) Provisional application No. 60/905,555, filed on Mar. 7, 2007, provisional application No. 60/958,194, filed on Jul. 3, 2007.

(51) Int. Cl.
*C08K 5/42* (2006.01)
(52) U.S. Cl. ........ 524/166; 524/359; 524/405; 524/413; 524/423; 524/424; 524/425; 524/432; 524/437; 524/442; 524/445; 524/449; 524/451; 524/452; 524/494
(58) Field of Classification Search .................. 524/166, 524/359, 405, 43, 423, 424, 425, 432, 437, 524/442, 445, 449, 451, 452, 494
See application file for complete search history.

(56) References Cited

U.S. PATENT DOCUMENTS

| | | | |
|---|---|---|---|
| 2,403,207 A | 7/1946 | Barrick | |
| 3,189,662 A | 6/1965 | Vaughn, Jr. | |
| 3,419,634 A | 12/1968 | Vaughn, Jr. | |
| 3,775,367 A | 11/1973 | Nouvertne | |
| 5,235,026 A | 8/1993 | Wulff et al. | |
| 5,319,066 A | 6/1994 | King, Jr. | |
| 5,449,710 A | 9/1995 | Umeda et al. | |
| 5,606,007 A | 2/1997 | Sakashita et al. | |
| 5,717,057 A | 2/1998 | Sakashita et al. | |
| 5,847,616 A | 12/1998 | Ng et al. | |
| 6,252,111 B1 | 6/2001 | Sakai et al. | |
| 6,339,821 B1 | 1/2002 | Maeda et al. | |
| 2006/0276670 A1 | 12/2006 | Junk et al. | |
| 2006/0276671 A1 | 12/2006 | Harmer et al. | |
| 2007/0082995 A1* | 4/2007 | Costanzi et al. | 524/414 |

FOREIGN PATENT DOCUMENTS

| | | |
|---|---|---|
| EP | 0 047 946 B1 | 6/1983 |
| EP | 1 029 850 A1 | 8/2000 |
| WO | WO 03/042303 A1 | 5/2003 |

OTHER PUBLICATIONS

Brunelle, D. J., "Polycarbonates", Kirk-Othmer Encyclo. of Chem. Technology, 5th Ed., (2006), John Wiley & Sons, Inc., Hoboken, NJ, vol. 19, pp. 797-828.
Desmarteau, D., and Hu, L. Q., "Synethsis of Perhaloalkanesulfonyl Halides and Their Sulfonimide Derivatives", Inorg. Chem. (1993), 32, 5007-5010.
Caporiccio, G., et al, "Perfluoroalkanesulfonylimides and Their Lithium Salts: Synthesis and Characterisation of Intermediates and Target Compounds", J. Fluor. Chem. (2004) 125, 243-252.
Lyapkalo, I. M., et al, "Synthesis and Properties of N,N'-Dialkylimidazolium BIS (Nonafluorobutane-1-Sulfonyl)imides: A New Subfamily of Ionic Liquids", Tetrahedron (2006) 62, 3137-3145.
PCT International Search Report and Written Opinion for International Application No. PCT/US2008/002704 dated Jun. 27, 2008.

* cited by examiner

Primary Examiner — Kriellion A Sanders

(57) ABSTRACT

The present invention relates to novel flame retardant polycarbonate resin compositions comprising at least one aromatic polycarbonate resin, at least one anti-drip agent, and at least one salt as defined herein. The present invention also provides methods for preparing articles comprising said flame retardant composition, and articles made therefrom.

18 Claims, No Drawings

FLAME RETARDANT POLYCARBONATE COMPOSITIONS

TECHNICAL FIELD

The present invention relates to novel flame retardant polycarbonate resin compositions.

BACKGROUND

Polycarbonate resin possesses excellent mechanical strength, particularly impact strength, electrical properties and optical clarity, and is widely utilized in a variety of fields of office automation machinery, electric and electronic machinery, automobiles, and architecture, among others. Polymers used in fields such as office automation machinery and electric and electronic machinery are required to have high flame retardancy. Typically, polycarbonate resins are made flame retardant through incorporation of both a flame retardant and an anti-drip agent to prevent the dripping of molten resin from a burning polycarbonate resin.

U.S. Pat. No. 3,775,367 discloses flame retardant polycarbonate compositions comprising alkali or tetraalkylammonium salts of perfluoroalkyl sulfonic acids. U.S. Pat. No. 5,449,710 discloses flame retardant polycarbonate compositions comprising alkali or alkaline-earth metal salts of perfluoroalkanesulfonic acids.

A need nevertheless remains for compounds that can be added at low levels to polycarbonate resins in order to make them flame retardant. The present invention provides non-perfluorinated, sulfonated salts that impart name retardancy to polycarbonate resins.

SUMMARY

One embodiment of this invention relates to a flame retardant polycarbonate composition comprising:
(A) at least one aromatic polycarbonate resin;
(B) at least one anti-drip agent; and
(C) at least one salt having the Formula $M^+Q^-$, wherein $M^+$ and $Q^-$ are as defined hereinbelow. In one particular embodiment, the flame retardant polycarbonate composition comprises about 100 parts of component (A), about 0.01 to about 5.0 parts of component (B), and about 0.001 to about 2.0 parts of component (C). In addition, the flame retardant polycarbonate composition may optionally also comprise one or more additives, fillers, or combinations thereof.

In another embodiment of this invention, an anti-drip agent may be poly-tetrafluoroethylene. In a further embodiment, an anti-drip agent is supplied as a mixture or kit comprising component (C).

Yet another embodiment of this invention provides a method for preparing a flame retardant polycarbonate article and articles made therefrom. The method comprises:
(a) mixing components (A), (B) and (C) and optional additives, fillers, and combinations thereof of the polycarbonate resin composition to form a mixed composition;
(b) forming the mixed composition into particles;
(c) melt forming the particles of step (b) into a flame retardant polycarbonate article.

DETAILED DESCRIPTION

The present invention relates to flame retardant polycarbonate resin compositions.

In one embodiment, the present invention relates to a flame retardant polycarbonate resin composition comprising the following components:
(A) at least one aromatic polycarbonate resin;
(B) at least one anti-drip agent; and
(C) at least one salt having the Formula $M^+Q^-$ wherein $M^+$ is (1) a cation selected from the group consisting of lithium, sodium, potassium and cesium or (2) a cation selected from the group consisting of the following eleven cations:

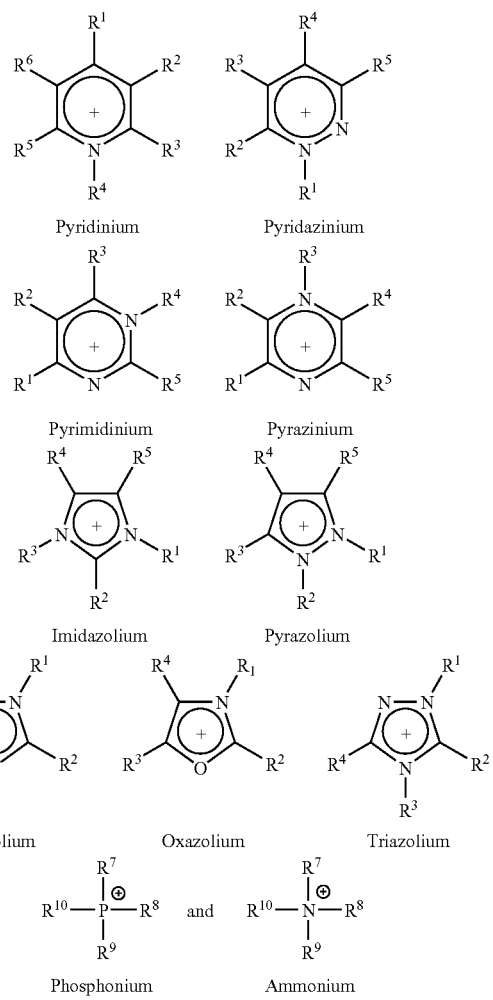

wherein $R^1$, $R^2$, $R^3$, $R^4$, $R^5$ and $R^6$ are independently selected from the group consisting of:
(a) H
(b) halogen
(c) —$CH_3$, —$C_2H_5$, or $C_3$ to $C_{25}$, preferably $C_3$ to $C_{20}$, straight-chain, branched or cyclic alkane or alkene, optionally substituted with at least one member selected from the group consisting of Cl, Br, F, I, OH, $NH_2$ and SH;
(d) —$CH_3$, —$C_2H_5$, or $C_3$ to $C_{25}$, preferably $C_3$ to $C_{20}$, straight-chain, branched or cyclic alkane or alkene comprising one to three heteroatoms selected from the group consisting of O, N, Si, and S, and optionally substituted with at least one member selected from the group consisting of Cl, Br, F, I, OH, $NH_2$ and SH;
(e) $C_6$ to $C_{25}$ unsubstituted aryl or $C_6$ to $C_{25}$ unsubstituted heteroaryl having one to three heteroatoms independently selected from the group consisting of O, N, Si, and S; and (f) $C_6$ to $C_{25}$ substituted aryl or $C_6$ to $C_{25}$ substituted heteroaryl having one to three heteroatoms independently selected from the group consisting of O, N, Si, and S; and wherein said substituted aryl or substituted heteroaryl has one to three substituents independently selected from the group consisting of:
  (1) —$CH_3$, —$C_2H_5$, or $C_3$ to $C_{25}$, preferably $C_3$ to $C_{20}$, straight-chain, branched or cyclic alkane or alkene, optionally substituted with at least one member selected from the group consisting of Cl, Br, F, I, OH, $NH_2$ and SH,
  (2) OH,
  (3) $NH_2$, and
  (4) SH;
$R^7$, $R^8$, $R^9$, and $R^{10}$ are independently selected from the group consisting of:
  (g) —$CH_3$, —$C_2H_5$, or $C_3$ to $C_{25}$, preferably $C_3$ to $C_{20}$, straight-chain, branched or cyclic alkane or alkene, optionally substituted with at least one member selected from the group consisting of Cl, Br, F, I, OH, $NH_2$ and SH;
  (h) —$CH_3$, —$C_2H_5$, or $C_3$ to $C_{25}$, preferably $C_3$ to $C_{20}$, straight-chain, branched or cyclic alkane or alkene comprising one to three heteroatoms selected from the group consisting of O, N, Si, and S, and optionally substituted with at least one member selected from the group consisting of Cl, Br, F, I, OH, $NH_2$ and SH;
  (i) $C_6$ to $C_{25}$ unsubstituted aryl or $C_6$ to $C_{25}$ unsubstituted heteroaryl having one to three heteroatoms independently selected from the group consisting of O, N, Si, and S; and
  (j) $C_6$ to $C_{25}$ substituted aryl or $C_6$ to $C_{25}$ substituted heteroaryl having one to three heteroatoms independently selected from the group consisting of O, N, Si, and S; and wherein said substituted aryl or substituted heteroaryl has one to three substituents independently selected from the group consisting of
  (1) —$CH_3$, —$C_2H_5$, or $C_3$ to $C_{25}$, preferably $C_3$ to $C_{20}$, straight-chain, branched or cyclic alkane or alkene, optionally substituted with at least one member selected from the group consisting of Cl, Br, F, I, OH, $NH_2$ and SH,
  (2) OH,
  (3) $NH_2$, and
  (4) SH; and wherein
optionally at least two of $R^1$, $R^2$, $R^3$, $R^4$, $R^5$, $R^6$, $R^7$, $R^8$, $R^9$, and $R^{10}$ can together form a cyclic or bicyclic alkanyl or alkenyl group;
and wherein $Q^-$ is an anion selected from the group consisting of Formula I and Formula II:

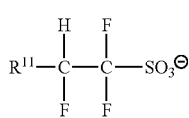

Formula I wherein:
$R^{11}$ is selected from the group consisting of:
  (1) halogen;
  (2) —$CH_3$, —$C_2H_5$ or $C_3$ to $C_{15}$, preferably $C_3$ to $C_6$, straight-chain or branched alkane or alkene, optionally substituted with at least one member selected from the group consisting of Cl, Br, I, OH, $NH_2$ and SH;
  (3) —$OCH_3$, —$OC_2H_5$ or $C_3$ to $C_{15}$, preferably $C_3$ to $C_6$, straight-chain or branched alkoxy, optionally substituted with at least one member selected from the group consisting of Cl, Br, I, OH, $NH_2$ and SH;
  (4) $C_1$ to $C_{15}$, preferably $C_1$ to $C_6$, straight-chain or branched fluoroalkyl, optionally substituted with at least one member selected from the group consisting of Cl, Br, I, OH, $NH_2$ and SH;
  (5) $C_1$ to $C_{15}$, preferably $C_1$ to $C_6$, straight-chain or branched fluoroalkoxy, optionally substituted with at least one member selected from the group consisting of Cl, Br, I, OH, $NH_2$ and SH;
  (6) $C_1$ to $C_{15}$, preferably $C_1$ to $C_6$, straight-chain or branched perfluoroalkyl; and
  (7) $C_1$ to $C_{15}$, preferably $C_1$ to $C_6$, straight-chain or branched perfluoroalkoxy;
and

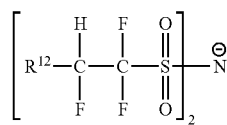

Formula II wherein:
$R^{12}$ is selected from the group consisting of:
  (1) halogen;
  (2) —$CH_3$, —$C_2H_5$ or $C_3$ to $C_{15}$, preferably $C_3$ to $C_6$, straight-chain or branched alkane or alkene, optionally substituted with at least one member selected from the group consisting of Cl, Br, I, OH, $NH_2$ and SH;
  (3) —$OCH_3$, —$OC_2H_5$ or $C_3$ to $C_{15}$, preferably $C_3$ to $C_6$, straight-chain or branched alkoxy, optionally substituted with at least one member selected from the group consisting of Cl, Br, I, OH, $NH_2$ and SH;
  (4) $C_1$ to $C_{15}$, preferably $C_1$ to $C_6$, straight-chain or branched fluoroalkyl, optionally substituted with at least one member selected from the group consisting of Cl, Br, I, OH, $NH_2$ and SH;
  (5) $C_1$ to $C_{15}$, preferably $C_1$ to $C_6$, straight-chain or branched fluoroalkoxy, optionally substituted with at least one member selected from the group consisting of Cl, Br, I, OH, $NH_2$ and SH;
  (6) $C_1$ to $C_{15}$, preferably $C_1$ to $C_6$, straight-chain or branched perfluoroalkyl; and
  (7) $C_1$ to $C_{15}$, preferably $C_1$ to $C_6$, straight-chain or branched perfluoroalkoxy.

According to the present invention, a flame retardant polycarbonate resin composition is a polycarbonate resin composition that meets flame retardancy requirements after compounding of the composition. In the United States, flame retardancy of the compounded composition may be determined using test specimens prepared from the compounded composition as described in test method UL-94 of Underwriter's Laboratories, Inc. (Northbrook, Ill.). It is preferred that the compounded composition have a V-0 classification according to UL-94.

The proportion by weight of components (A), (B), and (C) in the polycarbonate resin composition is about 100 parts of component (A), about 0.01 to about 5.0 parts of component (B), and about 0.001 to about 2.0 parts of component (C). In a more specific embodiment, component (B) is added at about 0.1 to about 3.0 parts, and in an even more specific embodiment, component (B) is added at about 0.25 to about 1.0 parts. In another embodiment, component (C) is added at about 0.01 to about 1.0 parts, and in an even more specific embodiment, component (C) is added at about 0.1 to about 0.5 parts. Where more than one aromatic polycarbonate resin, anti-drip agent or salt is used, the values for proportion by weight represent the combined weight of the individual aromatic polycarbonate resins, salts, or anti-drip agents. Additional components, such as fillers or pigments as described below, may be added to the resin composition. The amount of anti-drip agent, salt, or other optionally added component, added to component (A) will depend on a number of factors, such as the cost of the added components, flame retardancy of products produced from the polycarbonate resin composition, and mechanical and physical properties of products produced from the polycarbonate resin composition, such as impact strength.

Aromatic polycarbonate resins useful for the present invention corriprise the divalent residue of dihydric phenols bonded through a carbonate linkage and are represented by the formula:

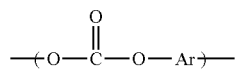

wherein Ar is a divalent aromatic group. Ar is preferably a divalent aromatic group represented by the formula: —$Ar^1$—Y—$Ar^2$— wherein each of $Ar^1$ and $Ar^2$ independently represents a divalent carbocyclic or heterocyclic aromatic group having from 5 to 30 carbon atoms, and Y represents a divalent alkane group having from 1 to 30 carbon atoms.

As used herein, the term "carbocyclic" means having or relating to or characterized by a ring composed of carbon atoms. As used herein, the term "heterocyclic" means having or relating to or characterized by a ring of atoms of more than one kind; especially a ring of carbon atoms containing at least one atom that is not carbon. "Heterocyclic aromatic groups" are aromatic groups having one or more ring nitrogen atoms, oxygen atoms or sulfur atoms.

Each of divalent aromatic groups $Ar^1$ and $Ar^2$ is either unsubstituted or substituted with at least one substituent which does not affect the polymerization reaction. Examples of suitable substituents include a halogen atom, an alkyl group having from 1 to 10 carbon atoms, an alkoxy group having from 1 to 10 carbon atoms, a phenyl group, a phenoxy group, a vinyl group, a cyano group, an ester group, an amide group and a nitro group.

Aromatic polycarbonate resins suitable for this invention, such as Lexan® HF1110, are commercially available from suppliers such as General Electric (Waterford, Mass.), or can be synthesized by any method known to those skilled in the art. A general description of polycarbonate preparation, processing and properties can be found in Brunelle, D. J., "Polycarbonates" in Kirk-Othmer Encyclopedia of Chemical Technology, (Fifth Edition (2006), John Wiley & Sons, Inc., Hoboken, N.J., Volume 19, pages 797-828). Two methods for preparing aromatic polycarbonate resins are described herein; these methods are meant to be illustrative of the process for preparing aromatic polycarbonate resins, and not inclusive of all variations or modifications.

According to one method, aromatic polycarbonate resin can be prepared by a melt condensation reaction, as described, for example, in U.S. Pat. No. 5,717,057, column 1, line 4 through column 45, line 10, U.S. Pat. No. 5,606,007, column 2, line 63 through column 25, line 23, and U.S. Pat. No. 5,319,066, column 2, line 5 through column 7, line 22. A suitable polycarbonate useful for the present invention can be produced by the base-catalyzed reaction of a diaryl carbonate and a dihydric phenol. A variety of diaryl carbonates and dihydric phenols are used to create polycarbonates of varying properties. Non-limiting examples of diaryl carbonates are diphenylcarbonate (DPC), ditolyl carbonate, bis(chlorophenyl)carbonate, m-cresyl carbonate, dinapthyl carbonate, bis(diphenyl)carbonate, diethyl carbonate, dimethyl carbonate, dibutyl carbonate and dicyclohexyl carbonate, bis(metriyl-salicyl) carbonate. Non-limiting examples of dihydric phenols are 1,1-bis(4-hydroxyphenyl) methane; 1,1-bis(4-hydroxyphenyl)ethane; 2,2-bis(4-hydroxyphenyl) propane (hereinafter "bisphenol A" or "BPA"); 2,2-bis(4-hydroxyphenyl) butane; 2,2-bis(4-hydroxyphenyl)octane; 1,1-bis(4-hydroxyphenyl) propane; 1,1-bis(4-hydroxyphenyl)n-butane; bis(4-hydroxyphenyl) phenylmethane; 2,2-bis(4-hydroxy-1-methylphenyl)propane; 1,1-bis(4-hydroxy-t-butylphenyl)propane; bis(hydroxyaryl)alkanes such as 2,2-bis(4-hydroxy-3-bromophenyl) propane; 1,1-bis(4-hydroxyphenyl) cyclopentane; 4,4'-biphenol; and bis (hydroxyaryl)cycloalkanes such as 1,1-bis(4-hydroxyphenyl) cyclohexane. A common combination used in industrial polycarbonate production is DPC and BPA.

Aromatic polycarbonate resins suitable for the present invention may also be prepared by a phase interface process. The phase interface process for polycarbonate synthesis is well known, and is described, for example, in H. Schnell, Chemistry and Physics of Polycarbonates, Polymer Reviews, vol. 9, Interscience Publishers, New York 1964 p. 33 et seq.; Polymer Reviews, vol. 10, "Condensation Polymers by Interfacial and Solution Methods", Paul W. Morgan, Interscience Publishers, New York 1965, chap. VIII, p. 325; Dres. U, Grigo, K. Kircher and P. R. Müller "Polycarbonate" in Becker/Braun, Kunststoff-Handbuch, vol. 3/1, Polycarbonate, Polyacetale, Polyester, Celluloseester, Carl Hanser Verlag Munich, Vienna 1992, p. 118-145; and U.S. Pat. No. 5,235,026, column 2, line 65 through column 8, line 8.

According to this process, the phosgenation of a disodium salt of a bisphenol (or of a mixture of various bisphenols) which has been initially introduced into an aqueous-alkaline solution (or suspension) is carried out in the presence of an inert organic solvent or solvent mixture which forms a second phase. The oligocarbonates formed, which are chiefly present in the organic phase, are subjected to further condensation with the aid of suitable catalysts such as but not limited to tertiary and quaternary amines such as triethyl amine and tetramethylammonium chloride to give high molecular weight polycarbonates dissolved in the organic phase. Finally, the organic phase is separated off and the polycarbonate is isolated therefrom by methods as described in Morgan (supra).

Polycarbonates suitable for the present invention also include polydimethylsiloxane-co-BPA polycarbonates. The synthesis of these polycarbonates is described in U.S. Pat. No. 3,189,662, column 1, line 9 through column 6, line 7, and U.S. Pat. No. 3,419,634, column 1, line 24 through column 15, line 22. The polydimethylsiloxane is present in the polydimethylsiloxane-co-BPA polycarbonate at about at least 1.0 weight percent based on the combined weight of the dimethylsiloxane plus the BPA. These polymers differ from those described above in that they have very low glass transition temperatures, yet retain excellent thermal stability and have good weathering properties. Additional methods of preparation are described in Brunelle, D. J. (supra).

Polycarbonates suitable for the present invention also include blends of polycarbonates with one or more polyimides, polyetherimides, polyamides, polyketones, polyesters, polyphenyl ethers, polystyrenes, acrylonitrile styrenes, acrylonitrile butadiene styrenes, polyethylenes, polypropylenes, and poly(methyl methacrylate).

Any suitable anti-drip agent component (B) can be used in the polycarbonate resin composition of the invention. The anti-drip agents can be supplied, for example, as finely ground powders. A typical anti-drip agent is micropowder poly-tetrafluoroethylene (p-TFE) (commercially available from E.I. du Pont de Nemours and Company, Wilmington Del.). In one embodiment, the at least one anti-drip agent can be supplied as part of a mixture or kit comprising the at least one anti-drip agent with the at least one salt (component (C)). The anti-drip agent can be supplied in the mixture or kit as a powder or dispersion. For example, p-TFE can be supplied in a mixture or kit as a micropowder or dispersion with component (C), wherein component C is a lithium, sodium, potassium or cesium salt of 1,1,2,2-tetrafluoroethanesulfonate or 1,1,2,3,3,3-hexafluoropropanesulfonate. More specifically, component C can be potassium 1,1,2,2-tetrafluoroethanesulfonate or potassium 1,1,2,3,3,3-hexafluoropropanesulfonate.

In preferred embodiments of the invention, component (C) comprises an anion (Q$^-$) selected from the group consisting of 1,1,2,2-tetrafluoroethanesulfonate; 2-chloro-1,1,2-trifluoroethanesulfonate; 1,1,2,3,3,3-hexafluoropropanesulfonate; 1,1,2-trifluoro-2-(trifluoromethoxy)ethanesulfonate; 1,1,2-trifluoro-2-(pentafluoroethoxy)ethanesulfonate; 2-(1,2,2,2-tetrafluoroethoxy)-1,1,2,2-tetrafluoroethanesulfonate; 2-(1,1,2,2-tetrafluoroethoxy)-1,1,2,2-tetrafluoroethanesulfonate; 2-(1,1,2,2-tetrafluoro-2-iodoethoxy)-1,1,2,2-tetrafluoroethanesulfonate; 1,1,2,2-tetrafluoro-2-(pentafluoroethoxy)ethanesulfonate; N,N-bis(1,1,2,2-tetrafluoroethanesulfonyl)imide; and N,N-bis(1,1,2,3,3,3-hexafluoropropanesulfonyl)imide.

Thus, in one embodiment, the at least one salt useful as component (C) comprises a cation selected from the group consisting of lithium, sodium, potassium, cesium, pyridinium, pyridaziniijm, pyrimidinium, pyrazinium, imidazolium, pyrazolium, thiazolium, oxazolium, triazolium, phosphonium, and ammonium as defined in all of the embodiments above; and an anion selected from the group consisting of 1,1,2,2-tetrafluoroethanesulfonate; 2-chloro-1,1,2-trifluoroethanesulfonate; 1,1,2,3,3,3-hexafluoropropanesulfonate; 1,1,2-trifluoro-2-(trifluoromethoxy)ethanesulfonate; 1,1,2-trifluoro-2-(perfluoroethoxy)ethanesulfonate; 2-(1,2,2,2-tetrafluoroethoxy)-1,1,2,2-tetralluoroethanesulfonate; 2-(1,1,2,2-tetrafluoroethoxy)-1,1,2,2-tetrafluoroethanesulfonate; 2-(1,1,2,2-tetrafluoro-2-iodoethoxy)-1,1,2,2-tetrafluoroethanesulfonate; 1,1,2,2-tetrafluoro-2-(pentafluoroethoxy)ethanesulfonate; N,N-bis(1,1,2,2-tetrafluoroethanesulfonyl)imide; and N,N-bis(1,1,2,3,3,3-hexafluoropropanesulfonyl)imide.

In another embodiment, the at least one salt useful as component (C) is selected from the group consisting of 1-butyl-2,3-dimethylimidazolium 1,1,2,2-tetrafluoroethanesulfonate, 1-butyl-methylimidazolium 1,1,2,2-tetrafluoroethanesulfonate, 1-ethyl-3-methylimidazolium 1,1,2,2-tetrafluoroethanesulfonate, 1-ethyl-3-methylimidazolium 1,1,2,3,3,3-hexafluoropropanesulfonate, 1-hexyl-3-methylimidazolium 1,1,2,2-tetrafluoroethanesulfonate, 1-dodecyl-3-methylimidazolium 1,1,2,2-tetrafluoroethanesulfonate, 1-hexadecyl-3-methylimidazolium 1,1,2,2-tetrafluoroethanesulfonate, 1-octadecyl-3-methylimidazolium 1,1,2,2-tetrafluoroethanesulfonate, N-(1,1,2,2-tetrafluoroethyl)propylimidazole 1,1,2,2-tetrafluoroethanesulfonate, N-(1,1,2,2-tetrafluoroethyl)ethylperfluorohexylimidazole 1,1,2,2-tetrafluoroethanesulfonate, 1-butyl-3-methylimidazolium 1,1,2,3,3,3-hexafluoropropanesulfonate, 1-butyl-3-methylimidazolium 1,1,2-trifluoro-2-(trifluoromethoxy)ethanesulfonate, 1-butyl-3-methylimidazolium 1,1,2-trifluoro-2-(perfluoroethoxy)ethanesulfonate, tetradecyl(tri-n-hexyl)phosphonium 1,1,2-trifluoro-2-(perfluoroethoxy)ethanesulfonate, tetradecyl(tri-n-butyl)phosphonium 1,1,2,3,3,3-hexafluoropropanesulfonate, tetradecyl(tri-n-hexyl)phosphonium 1,1,2-trifluoro-2-(trifluoromethoxy)ethanesulfonate, 1-ethyl-3-methylimidazolium 1,1,2,2-tetrafluoro-2-(pentafluoroethoxy)sulfonate, (3,3,4,4,5,5,6,6,7,7,8,8,8-tridecafluorooctyl)-trioctylphosphonium 1,1,2,2-tetrafluoroethanesulfonate, 1-methyl-3-(3,3,4,4,5,5,6,6,7,7,8,8,8-tridecafluorooctyl)imidazolium 1,1,2,2-tetrafluoroethanesulfonate, tetra-n-butylphosphonium 1,1,2-trifluoro-2-(perfluoroethoxy)ethanesulfonate, potassium 1,1,2,2-tetrafluoroethanesulfonate, potassium 1,1,2,3,3,3-hexafluoropropanesulfonate, and potassium 1,1,2-trifluoro-2-(perfluoroethoxy)ethanesulfonate.

Sources of cations (M$^+$) useful for component (C) are available commercially, or may be synthesized by methods known to those skilled in the art. The fluoroalkyl sulfonate anions of Formula I may be synthesized from perfluorinated terminal olefins or perfluorinated vinyl ethers generally according to the methods described in U.S. Patent Application No. 2006/0276670, paragraph 14 through paragraph 65 and U.S. Patent Application No. 2006/0276671, paragraph 12 through paragraph 88; in one embodiment, potassium sulfite and bisulfite are used as the buffer, and in another embodiment, the reaction is carried in the absence of a radical initiator. Preferred isolation methods include freeze drying or spray drying to isolate the crude 1,1,2,2-tetrafluoroethanesulfonate and 1,1,2,3,3,3-hexafluoropropanesulfonate products from the aqueous reaction mixture, using acetone to extract the crude 1,1,2,2-tetrafluoroethanesulfonate and 1,1,2,3,3,3-hexafluoropropanesulfonate salts, and crystallizing 1,1,2-trifluoro-2-(trifluoromethoxy)ethanesulfonate and 1,1,2-trifluoro-2-(pentafluoroethoxy)ethanesulfonate from the reaction mixture by cooling. The bis(fluoroalkylsulfonyl)imides of Formula II can be synthesized as described for the synthesis of bis(perfluoroalkylsulfonyl)imide salt compounds such as $(R_fSO_2)_2N(-)M(+)$ (see U.S. Pat. No. 5,847,616; DesMarteau, D. and Hu, L. Q. (Inorg. Chem. (1993), 32, 5007-5010); U.S. Pat. No. 6,252,111; Caporiccio, G. et al. (J. Fluor. Chem. (2004), 125, 243-252); and U.S. Pat. No. 6,399, 821). For example, 1,1,2,2-tetrafluoroethanesulfonic acid is first converted to the corresponding sulfonyl chloride by reaction with a suitable chlorinating reagent such as PCl$_5$ or catechol-PCl$_3$ as described in U.S. Pat. No. 2,403,207 and European Patent Application EP47946. The chlorine can be replaced by fluorine using potassium fluoride in an organic solvent such as acetonitrile to produce the sulfonyl fluoride.

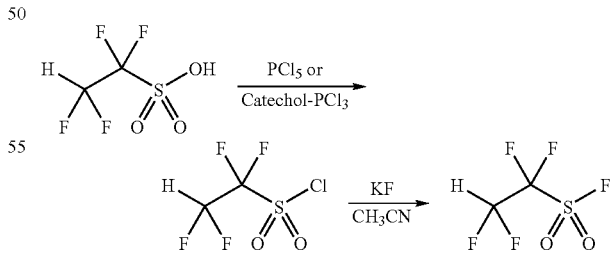

The sulfonyl fluoride is recovered, and two molecules of the sulfonyl fluoride can be coupled as described in Lyapkalo, I. M. (Tetrahedron (2006) 62, 3137-3145) to make the bis (fluoroalkylsulfonyl)imide. According to this procedure, ammonium chloride and triethylamine (Et$_3$N) are used in an organic solvent such as acetonitrile to convert the sulfonyl fluoride to the triethylammonium (NHEt$_3$) salt of the bis (fluoroalkylsulfonyl)imide. The potassium salt is then obtained by further treatment with potassium hydroxide in aqueous methanol.

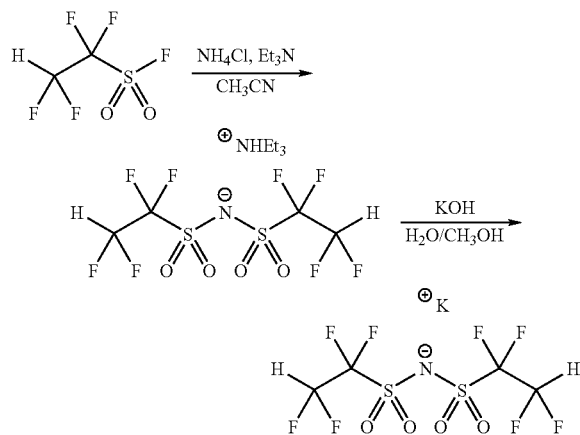

In addition to components (A), (B) and (C), the polycarbonate resin composition of the present invention may optionally also comprise one or more additives, fillers, or combinations thereof, as long as these additional components do not decrease the thermal stability or photochemical stability to a level that is undesirable, or decrease the flame retardancy of the polycarbonate to a level that is undesirable or that no longer meets flame retardancy requirements. Examples of additives include, but are not limited to, antioxidants such as hindered phenols, esters of phosphorous acid, esters of phosphoric acid and amines; ultraviolet absorbents such as benzotriazoles and benzophenones; light stabilizers such as hindered amines; internal lubricants such as aliphatic carboxylic acid esters, paraffin, silicone oil and polyethylene wax; and flame retardants or flame retarding aids; mold release agents such as pentaerythritol or glycerol; antistatic agents; coloring agents; and combinations thereof.

Aromatic polycarbonate resins can be compounded with at least one filler as is known in the art. Examples of fillers include potassium titanate whisker, mineral fiber such as rock wool, glass fiber, carbon fiber, metallic fiber such as stainless steel fiber, aluminum borate whisker, silicon nitride whisker, boron fiber, zinc oxide whisker of tetrapod-shap, talc, clay, mica, pearl mica, aluminum foil, alumina, glass flake, glass beads, glass balloon, carbon black, graphite, calcium carbonate, calcium sulfate, calcium silicate, titanium dioxide, zinc sulfide, zinc oxide, silica, asbestos, quartz powder, and combinations thereof. Fillers may be surface treated by physical or chemical methods in order to improve interfacial bonding and enhance mechanical properties. Interfacial bonding refers to bonding in which the surfaces of two bodies in contact with one another are held together by intermolecular forces. Fillers can be treated, for example, with silane-based coupling agents, higher fatty acids, metallic salts of fatty acids, unsaturated organic acids, organic titanates, resin acids, polyethylene glycols, or polymethylhydrogensiloxane fluids of the type, $Me_3Si-O-[SiOMe_2]_m-[SiOMeH]_n-SiMe_3$ wherein Me is methyl, m can range from 0-100 and n can range from 1-50. Most preferably m is 0 and n is approximately 50.

The at least one filler is generally used at about 1 part to about 70 parts by weight (relative to 100 parts of the at least one aromatic polycarbonate resin). When more than one filler is used, the value for proportion by weight represents the combined weight of the individual fillers. In a more specific embodiment, the at least one filler is used at about 2 parts to about 40 parts by weight (relative to 100 parts of the at least one aromatic polycarbonate resin).

The present invention also relates to a method for preparing flame retardant polycarbonate articles. According to the method, the flame retardant polycarbonate articles can be prepared by a process comprising:

(a) mixing components (A), (B) and (C), and optional additives, fillers and combinations thereof, of the polycarbonate resin composition as defined above;

(b) forming the mixed composition into particles;

(c) melt forming the particles of step (b) into a flame retardant polycarbonate article.

More specifically, the components of the polycarbonate resin composition can be mixed by compounding or kneading the components of the composition using any processing operation known to those skilled in the art. See, for example, Brunelle, D. J., "Polycarbonates" in Kirk-Othmer Encyclopedia of Chemical Technology, (Fifth Edition (2006), John Wiley & Sons, Inc., Hoboken, N.J., Volume 19, pages 797-828) for a description of processing of polycarbonates. Compounding or kneading can be carried out, for example, using a Banbury mixer, a single-screw extruder, a twin-screw extruder, a multi-screw extruder or the like. Compounding is typically carried out at a temperature of about 240 degrees Centigrade to about 300 degrees Centigrade. Components (B), (C), and optional additives or fillers can be added together with the at least one aromatic polycarbonate resin. Alternatively, these components can be added at one or more downstream points in an extruder, for example. The addition of components downstream can decrease attrition of solids such as fillers, and/or improve dispersion, and/or decrease the thermal history of relatively thermally unstable components, and/or decrease losses by evaporation of volatile components. After the components are mixed, they may be formed or cut into pellets or other particles suitable for feeding to a melt forming machine. Melt forming can be carried out by the usual methods for thermoplastics, such as injection molding, blow molding, extrusion molding, compression molding, calendar molding, rotation molding and the like to form desired articles.

It is expected that articles formed comprising the polycarbonate resin compositions of the present invention would find utility in many applications where polycarbonate is currently used. Examples include, but are not limited to, glazing and sheet; automotive components; appliances, such as houseware items and power tools; packaging, such as refillable water bottles and refillable milk bottles; electrical, electronic, and technical components; medical and health-care related articles; and leisure and safety articles. Examples of glazing and sheet applications include, but are not limited to, windows for airplanes, trains, and schools; and high speed aircraft canopies. Such products may be laminated, for example, with a soft inner layer. Examples of automotive components include, but are not limited to, headlamp assemblies, interior instrument panels, bumpers, and automotive window glazing. Examples of electrical, electronic, and technical components include, but are not limited to, electrical connectors, telephone network devices, outlet boxes, computer and business machine housings, instrument panels, membrane switches and insulators. Examples of leisure and safety articles include, but are not limited to, protective headgear (e.g., sports helmets, motorcycle helmets, and safety helmets for firefighters and constructions workers) and protective eyewear (e.g., for goggles, safety glasses, safety sideshields, eyeglasses, and masks). The resin compositions are particularly useful for those applications requiring flame retardant materials, such as office automation machinery, and electric and electronic machinery.

Flammability of the polycarbonate resin composition can be determined using appropriate methods. For example, methods may be used that are appropriate for the country in which the polycarbonate will be used. In the United States, flame retardant polycarbonates of the invention may be required to meet Underwriter's Laboratory standards, particularly UL-94 (Underwriters Laboratories, Inc., Northbrook, Ill.). UL-94 tests materials based on their ability to resist combustion on repeated application of a flame, as well as the resistance of materials to dripping with subsequent ignition of a combustible source (cotton) from the resulting drips. Test specimens are mounted in a chamber and ignited for 10 seconds. If the specimen extinguishes, the afterflame time is recorded and the specimen is reignited for 10 seconds. Materials are then classified on the basis of the afterflame time and ignition of the cotton caused by flaming drips. The most widely accepted classes are V-0, V-1 and V-2. Class V-1 allows for a longer afterflame time than V-0, whereas V-2 has the same afterflame time as V-1, but allows for cotton ignition. For the present invention an afterflame time of <10 seconds was used for V-0 and <30 seconds was used for V-1 and V-2.

In the following examples, the present invention will be described in more detail with reference to comparative examples and examples, which however shall not be construed to lirit the invention thereto.

General Materials and Methods

The following abbreviations were used:
Degrees Centigrade is "C" or "degrees C."; gram(s) is "g"; "h" is "hour"; relative humidity is "RH"; millimeter is "mm"; nuclear magnetic resonance is "NMR"; and differential scanning calorimetry is "DSC".

The syntheses of potassium 1,1,2,3,3,3-hexafluoropropanesulfonate (HFPS-K) and potassium 1,1,2,2-tetrafluoroethanesulfonate (TFES-K) are described in U.S. Patent Application No. 2006/027661, Examples 2, 4 and 5.

Synthesis of tetra-n-butylphosphonium 1,1,2,3,3,3-hexafluoropropanesulfonate (TBP-HFPS)

Deionized water (2800 mL) and potassium 1,1,2,3,3,3-hexafluoropropanesulfonate (HFPS-K, 551.2 g) were added to a 4 L erlenmeyer flask. The contents of the flask were stirred magnetically at room temperature until the HFPS-K dissolved to produce a clear colorless solution. To this solution was added a 75 wt. % aqueous solution of tetra-n-butylphosphonium bromide (Cyphos® 443W, Cytec Canada Inc., 923.0 g). A large amount of flaky white precipitate was formed, and this mixture was allowed to stir for 8 h at room temperature. The white precipitated product was isolated by suction filtration. The crude product was then stirred magnetically with 1000 mL of saturated sodium carbonate for 30 min. to remove any acidic impurities. The product was again isolated by suction filtration. The product was further washed with 3×1000 mL portions of deionized water to remove any residual carbonate. This material was isolated by suction filtration and then dried in vacuo (70 C, 100 Torr, 18 h) above its melting point to remove water. The product was allowed to cool and solidify in the oven under a purge of nitrogen gas. The solid product cake was removed from the oven and passed through a #14 mesh (1.4 mm) screen to give a free-flowing solid (893 g, 89% yield).

$^{19}$F NMR (CD$_2$Cl$_2$) δ −74.9 (m, 3F); −115.3, −122.8 (ABq, J=264 Hz, 2F); −210.1 (dm, 1F). $^1$H NMR (CD$_2$Cl$_2$) δ 1.0 (t, J=7.3 Hz, 12H); 1.5 (m, 16H); 2.2 (m, 8H); 5.4 (dm, J$_{FH}$=54 Hz, 1H).

% Water by Karl-Fisher titration: 671 ppm.
Melting point (DSC): 74° C.
Elemental analysis for C$_{19}$H$_{37}$F$_6$O$_3$PS: Calculated: % C, 46.5: H, 7.6: N, 0.0.
Experimental results: % C, 46.9: H, 8.0: N, <0.1.

Synthesis of Potassium 1,1,2-trifluoro-2-(Perfluoroethoxy)ethanesulfonate (TPES-K)

The synthesis of TFES-K has been described in U.S. Patent Application No. 2006/0276671. A 1-gallon Hastelloy® C276 reaction vessel was charged with a solution of potassium sulfite hydrate (88 g, 0.56 mol), potassium metabisulfite (340 g, 1.53 mol) and deionized water (2000 ml). The vessel was cooled to 7 degrees C., evacuated to 0.05 MPa, and purged with nitrogen. The evacuate/purge cycle was repeated two more times. To the vessel was then added perfluoro(ethylvinyl ether) (PEVE, 600 g, 2.78 mol), and it was heated to 125 degrees C. at which time the inside pressure was 2.31 MPa. The reaction temperature was maintained at 125 degrees C. for 10 hr. The pressure dropped to 0.26 MPa at which point the vessel was vented and cooled to 25 degrees C. The crude reaction product was a white crystalline precipitate with a colorless aqueous layer (pH=7) above it.

The $^{19}$F NMR spectrum of the white solid showed pure desired product, while the spectrum of the aqueous layer showed a small but detectable amount of a fluorinated impurity. The desired isomer is less soluble in water so it precipitated in isomerically pure form.

The product slurry was suction filtered through a fritted glass funnel, and the wet cake was dried in a vacuum oven (60 degrees C., 0.01 MPa) for 48 hr. The product was obtained as off-white crystals (904 g, 97% yield).

$^{19}$F NMR (D$_2$O) δ −86.5 (s, 3F); −89.2, −91.3 (subsplit ABq, J$_{FF}$=147 Hz, 2F); −119.3, −121.2 (subsplit ABq, J$_{FF}$=258 Hz, 2F); −144.3 (dm, J$_{FH}$=53 Hz, 1F).

$^1$H NMR (D$_2$O) δ 6.7 (dm, J$_{FH}$=53 Hz, 1H).
Mp (DSC) 263 degrees C.
Analytical calculation for C$_4$HO$_4$F$_8$SK: C, 14.3: H, 0.3
Experimental results: C, 14.1: H, 0.3.
TGA (air): 10% wt. loss @ 359 degrees C., 50% wt. loss @ 367 degrees C.
TGA (N$_2$): 10% wt. loss @ 362 degrees C., 50% wt. loss @ 374 degrees C.

A similar process can be used for the synthesis of TFES-Na, using molar amounts equivalent to that described above for potassium.

Synthesis of 1-butyl-3-methylimidazolium 1,1,2,2-tetrafluoroethanesulfonate (BMIM-TFES)

1-Butyl-3-methylimidazolium chloride (60.0 g) and high purity dry acetone (>99.5%, 300 ml) were combined in a 1 liter flask and warmed to reflux with magnetic stirring until the solid completely dissolved. At room temperature in a separate 1 liter flask, potassium-1,1,2,2-tetrafluoroethanesulfonte (TFES-K, 75.6 g) was dissolved in high purity dry acetone (500 ml). These two solutions were combined at room temperature and allowed to stir magnetically for 2 hr under positive nitrogen pressure. The stirring was stopped and the KCl precipitate was allowed to settle, then removed by suction filtration through a fritted glass funnel with a celite pad. The acetone was removed in vacuo to give a yellow oil. The oil was further purified by diluting with high purity acetone (100 ml) and stirring with decolorizing carbon (5 g). The mixture was again suction filtered and the acetone removed in vacuo to give a colorless oil. This was further dried at 4 Pa and 25 degrees C. for 6 hr to provide 83.6 g of product.

$^{19}$F NMR (DMSO-$d_6$) δ −124.7 (dt, J=6 Hz, J=8 Hz, 2F); −136.8 (dt, J=53 Hz, 2F).

$^1$H NMR (DMSO-$d_6$) δ 0.9 (t, J=7.4 Hz, 3H); 1.3 (m, 2H); 1.8 (m, 2H); 3.9 (s, 3H); 4.2 (t, J=7 Hz, 2H); 6.3 (dt, J=53 Hz, J=6 Hz, 1H); 7.4 (s, 1H); 7.5 (s, 1H); 8.7 (s, 1H).

% Water by Karl-Fisher titration: 0.14%.

Analytical calculation for $C_9H_{12}F_6N_2O_3S$: C, 37.6: H, 4.7: N, 8.8.

Experimental Results: C, 37.6: H, 4.6: N, 8.7.

TGA (air): 10% wt. loss @ 380 degrees C., 50% wt. loss @ 420 degrees C.

TGA ($N_2$): 10% wt. loss @ 375 degrees C., 50% wt. loss @ 422 degrees C.

Synthesis of Lithium and Cesium Salts of Fluorinated Alkylsulfonates

Potassium and sodium salts of fluorinated alkylsulfonates, either purified or as crude dried reaction mixtures, can be converted into their anhydrous acids as taught in U.S. patent application 2006/0276671. These acids can then be allowed to react with lithium or cesium carbonate in an organic solvent such as methanol to give in high yield the corresponding lithium or cesium fluorinated alkylsulfonate salt. The lithium or cesium salt product can be isolated by first removing any excess insoluble carbonate salt by filtration and then removing the organic solvent by vacuum distillation. Caution should be taken with the lithium salt to keep the system anhydrous since lithium salts are typically extremely hygroscopic.

Synthesis of lithium 1,1,2,2-tetrafluoroethanesulfonte (TFES-Li) from 1,1,2,2-tetrafluoroethanesulfonic acid (TFESA)

1,1,2,2-tetrafluoroethanesulfonic acid (10.05 g, 0.055 mol) and dry methanol (10 mL; EMD Chemicals Inc., Gibbstown, N.J.) were added to a 20 mL vial. The solution was cooled to 0 C with magnetic stirring in an ice bath under an atmosphere of nitrogen. In a separate flask, lithium carbonate (0.95 g, 0.026 mol; Aldrich, St. Louis, Mo.) was mixed with dry methanol (10 mL) and stirred magnetically in an ice bath under an atmosphere of nitrogen until it too was at 0 C. The TFESA solution was then added slowly to the carbonate mixture generating a large amount of gaseous $CO_2$. Once addition was complete and the evolution of gas stopped, the methanol was removed in vacuo on a rotary evaporator. The flask was then heated in vacuo to 80 C for 3 hours to drive off the water which was formed during the reaction. A white powdery product (TFES-Li, 8.7 g, 84% yield) was isolated and characterized.

% water by Karl-Fisher titration: 0.27 wt. %

Elemental analysis for $C_2H_1F_4LiO_3S$: Calculated: % C, 12.78: H, 0.54.

Experimental results: % C, 12.53: H, 0.74.

Synthesis of 1-butyl-3-methylimidazolium nonafluorobutanesulfonate (BMIM-NONA)

BMIM-NONA can be synthesized as described in S. K. Quek, et al. (Tetrahedron (2006) 62:3137-3145.

Synthesis of tetradecyl(tri-n-butyl)phosphonium 1,1,2,2-tetrafluoroethanesulfonate ([4.4.4.14]P-TFES)

In a 1000 mL flask, potassium 1,1,2,2-tetrafluoroethane-sulfonate (TFESK, 85.2 g, 0.39 mol) and deionized water (150 mL) were stirred magnetically at 25 C until the solid dissolved. In a separate 500 mL flask, tetradecyl(tri-n-butyl) phosphonium chloride (168 g, 0.39 mol Cyphos® IL 167; Cytec (West Paterson, N.J.)) was first melted by heating to 50 C, and then added to the TFESK solution to produce an oily precipitate. The flask was stirred at 25 C for another 19 h to allow complete precipitation of the product.

Chloroform (500 mL; Ali-ich) was added to the mixture which was stirred for another 30 min. The chloroform layer, which contained the product, was separated and set aside. The aqueous layer was extracted with chloroform (5×20 mL washes) and these aliquots were combined with the original chloroform layer. The combined chloroform solution was washed with a saturated aqueous sodium carbonate solution (5×20 mL washes; Aldrich), followed by washes with deionized water (5×20 mL) until the final wash water had pH=8.

The solution was dried over anhydrous magnesium sulfate (Aldrich), at which point 10 g of decolorizing carbon was added to remove colored impurities. This solution was stirred for another 30 minutes before being filtered through a 6-inch column packed celite/basic alumina column to remove the carbon. The solution was again dried over anhydrous magnesium sulfate (Aldrich) and concentrated on a rotovap and then further dried (60 milliTorr, 25 C, 8 h.) to give the [4.4.4.14] P-TFES product as a clear light yellow oil (173 g, 77% yield).

$^{19}$F NMR (CDCl$_3$) δ −124.3 (dt, $^3J_{FH}$=6 Hz, $^3J_{FF}$=8 Hz, 2F); −136.0 (dt, $^2J_{FH}$=53 Hz, 2F).

$^1$H NMR (CDCl$_3$) δ 0.8 (t, J=7.0 Hz, 3H); 1.0 (t, J=7.0 Hz, 9H); 1.3 (br s, 20H); 1.5 (m, 16H); 2.2 (m, 8H); 6.2 (tt, $^2J_{FH}$=53 Hz, $^3J_{FH}$=6 Hz, 1H).

% Water by Karl-Fisher titration: 594 ppm.

Example 1

Flame Retardancy of Polycarbonate Resin (Comparative Example)

Polycarbonate resin (1484.5 g; sold under the trade name Lexan® HF-1110 (General Electric Co., Pittsfield, Mass.)) was placed into a V-Cone blender fitted with intensifier bar (Patterson Kelly, East Stroudsburg, Pa.). The resin was coated with 4 g of poly dimethyl siloxane DC-200-60M (Dow Corning, Midland, Mich.). After allowing the coating to adhere to the resin for 5 minutes, the coated polycarbonate pellets were fed into a 30 mm twin screw extruder (Werner-Pfleiderer, Coperion, Ramsey, N.J.) at 275 C. The compounded polycarbonate was injection molded on a 1.5 ounce Arburg injection molding machine (Newington, Conn.) fitted with a 1/16 inch (approximately 1.59 mm) ASTM (ASTM International, West Conshohocken, Pa.) single gated llex bar mold. The samples were stored in a room at 22 C and 50% relative humidity for a minimum of 1 day prior to being tested for flame retardancy.

All samples were tested according to standard flame retardancy test procedure UL-94 (Underwriters Laboratories, Inc., Northbrook, Ill.). Test specimens were tested in the vertical position. The regulated flame was placed onto a test specimen for 10 seconds and the time measured until the flame self extinguished was recorded as t1. The flame was put onto the bar again test specimens for 10 seconds and removed, and the second burn time was recorded as t2. The presence of burning drips was also noted. No afterflame was noted on any test sample when the flame was removed. The criteria used for classifying the samples as V-0, V-1 or V-2 are shown in Table 1, wherein t1 and t2 are reported in seconds. The results are shown in Table 2.

TABLE 1

Criteria used for classifying samples as V-0, V-1 or V-2.
Times for V-0, V-1 and V-2 are in seconds.

| Criterion | V-0 | V-1 | V-2 |
|---|---|---|---|
| Afterflame time for each individual specimen t1 or t2 | <10 | <30 | <30 |
| Total afterflame time for any condition set (t1 plus t2 for 5 specimens) | <50 | <250 | <250 |
| Cotton indicator ignited by flaming particles or drops | No | No | Yes |

Example 2

Flame Retardancy of Polycarbonate Resin Plus Antidrip Agent (Comparative Example)

The procedure of Example 1 was repeated, however polytetrafluoroethylene (p-TFE) antidrip agent (7 g; MP1400, E.I. DuPont, Wilmington Del.) was added. The results are shown in Table 2.

Examples 3-6

Flame Retardancy of Polycarbonate Resin Plus Salt

The procedure of Example 2 was repeated except that, in addition to the p-TFE, 4.5 g of a salt were added as indicated. The results are shown in Table 2.

TABLE TWO

Flame retardancy testing of polycarbonate with or without anti-drip agent and/or salt.

| Example Number | Sample | t1 | t2 | Flaming Drip | Classification |
|---|---|---|---|---|---|
| 1 | Resin | 9.5 | 3.2 | Yes | V-2 |
| 2 | p-TFE | 7.5 | 2.4 | Yes | V-2 |
| 3 | TBP-HFPS | 1.0 | 2.4 | No | V-0 |
| 4 | HFPS-K | 2.4 | 9.0 | No | V-0 |
| 5 | TPES-K | 4.3 | 2.4 | No | V-0 |
| 6 | BMIM-TFES | 0.9 | 0.8 | No | V-0 |

All values in Table 2 are the average of 5 measurements.
Abbreviations:
TBP-HFPS, n-butyl phosphonium 1,1,2,3,3,3-hexafluoropropanesulfonate;
HFPS-K, potassium 1,1,2,3,3,3-hexafluorpropanesulfonate;
TPES-K, potassium 1,1,2-trifluoro-2-(perfluoroethoxy)ethanesulfonate;
BMIM-TFES, 1-butyl-3-methylimidazolium 1,1,2,2 tetrafluoroethane sulfonate.

Examples 7-14

Flame Retardancy of Polycarbonate Resin Plus Salt

Polycarbonate samples (specimens) were compounded as described in Example 1 using 3000 ppm salt as indicated in Table 3 below and 5000 ppm p-TFE micropowder. The compounded polycarbonate was further molded into bars as described in Example 1. The test samples were tested according to UL-94 as described previously. The results are shown in Table 3.

TABLE THREE

Flame retardancy testing of polycarbonate.

| Example Number | Sample | t1 | t2 |
|---|---|---|---|
| 7 | Resin + p-TFE only | 13.5 | 23.0 |
| 8 | TFES-K | 1.1 | 2.0 |
| 9 | BMIM-TFES | 1.5 | 1.5 |
| 10 | BMIM-NONA | 1.0 | 1.0 |
| 11 | TBP-TFES | 4.3 | 1.0 |
| 12 | BMIM-TFES | 4.0 | 1.5 |
| 13 | [4.4.4.14]P-TFES | 3.0 | 1.0 |
| 14 | BMIM-NONA | 2.0 | 1.0 |

Examples 15-20

The Effect of Salt Concentration on Flame Retardancy of Polycarbonate Samples

The effect of salt concentration on flame retardancy was determined. Polycarbonate samples (specimens) were compounded with 5000 ppm p-TFE micropowder as described in Examples 7-14 using BMIM-TFES or TFES-K as the salt at concentrations indicated in Table 4 below. The compounded polycarbonate was further molded into bars as described in Example 1. The test samples were tested according to UL-94 as described previously. The results are shown in Table 4.

TABLE FOUR

Flame retardancy testing of polycarbonate.

| Example Number | Sample | Salt Conc. (ppm) | t1 | t2 |
|---|---|---|---|---|
| 15 | BMIM-TFES | 3000 | 1.0 | 0.6 |
| 16 | BMIM-TFES | 1500 | 0.8 | 0.0 |
| 17 | BMIM-TFES | 750 | 0.4 | 0.2 |
| 18 | TFES-K | 3000 | 0.8 | 2.4 |
| 19 | TFES-K | 1500 | 1.0 | 3.0 |
| 20 | TFES-K | 750 | 1.0 | 1.3 |

What is claimed is:

1. A flame retardant polycarbonate resin composition comprising:
   (A) at least one aromatic polycarbonate resin;
   (B) at least one anti-drip agent; and
   (C) at least one salt having the Formula $M^+Q^-$ wherein $M^+$ is a cation selected from the group consisting of lithium, sodium, potassium and cesium; and wherein $Q^-$ is an anion selected from the group consisting of 1,1,2,2-tetrafluoroethanesulfonate and 1,1,2,3,3,3-hexafluoropropanesulfonate.

2. The composition of claim 1 having about 100 parts of component (A), about 0.01 to about 5.0 parts of component (B), and about 0.001 to about 2.0 parts of component (C).

3. The composition of claim 2 having about 100 parts of component (A), and about 0.1 to about 3.0 parts of component (B).

4. The composition of claim 2 having about 100 parts of component (A), and about 0.01 to about 1.0 parts of component (C).

5. The composition of claim 1, wherein the at least one aromatic polycarbonate resin is prepared from the reaction of diphenylcarbonate and 2,2-bis(4-hydroxyphenyl)propane.

6. The composition of claim 1, wherein component (B) comprises poly-tetrafluoroethylene.

7. The composition of claim 6 wherein component (B) comprises poly-tetrafluoroethylene micropowder or poly-tetrafluoroethylene dispersion.

8. The composition of claim 1 wherein said salt comprises potassium 1,1,2,2-tetrafluoroethanesulfonate or potassium 1,1,2,3,3,3-hexafluoropropanesulfonate.

9. The composition of claim 1, further comprising at least one component selected from the group consisting of (1) at least one additive selected from the group consisting of antioxidants, ultraviolet absorbents, light stabilizers, internal lubricants, and flame retardants or flame retarding aids, mold release agents, antistatic agents, coloring agents, and combinations thereof; (2) at least one filler; and (3) combinations thereof.

10. The composition of claim 9, wherein an antioxidant comprises a hindered phenol, ester of phosphorous acid, ester of phosphoric acid or amine; an ultraviolet absorbent comprises a benzotriazole or benzophenone; a light stabilizer comprises a hindered amine; an internal lubricant comprises an aliphatic carboxylic acid ester, paraffin, silicone oil or polyethylene wax; a mold release agent comprises pentaerythritol or glycerol; and a filler is selected from the group consisting of potassium titanate whisker, mineral fiber, glass fiber, carbon fiber, metallic fiber, aluminum borate whisker, silicon nitride whisker, boron fiber, zinc oxide whisker of tetrapod-shape, talc, clay, mica, pearl mica, aluminum foil, alumina, glass flake, glass beads, glass balloon, carbon black, graphite, calcium carbonate, calcium sulfate, calcium silicate, titanium dioxide, zinc sulfide, zinc oxide, silica, asbestos, and quartz powder.

11. The composition of claim 9, wherein a filler is present at about 1 part to about 70 parts by weight.

12. The composition of claim 1, wherein component (B) comprises poly-tetrafluoroethylene, and component (C) comprises the sodium or potassium salt of 1,1,2,2-tetrafluoroethanesulfonate or 1,1,2,3,3,3-hexafluoropropanesulfonate.

13. The composition of claim 1, wherein component (A) is prepared from the reaction of diphenylcarbonate and 2,2-bis(4-hydroxyphenyl)propane, component (B) comprises poly-tetrafluoroethylene, and component (C) comprises the sodium or potassium salt of 1,1,2,2-tetrafluoroethanesulfonate or 1,1,2,3,3,3-hexafluoropropanesulfonate.

14. A method for preparing a flame retardant polycarbonate article from the composition of claim 1, the method comprising:
(a) mixing the components of the polycarbonate resin composition as defined in claim 12 to form a mixed composition;
(b) forming the mixed composition into particles;
(c) melt forming the particles of step (b) into a flame retardant polycarbonate article.

15. The method of claim 14, wherein the mixing is carried out using a Banbury mixer, a single-screw extruder, a twin-screw extruder, of a multi-screw extruder.

16. The method of claim 14, wherein the melt forming is carried out using injection molding, blow molding, extrusion molding, compression molding, calender molding, or rotation molding.

17. A flame retardant polycarbonate article comprising a flame retardant polycarbonate resin composition according to claim 1, selected from the group consisting of glazing or sheet; an automotive component; a home appliance; packaging; an electrical, electronic, or technical component; a medical or health care related article; and a leisure or safety article.

18. A flame retardant polycarbonate article according to claim 17 selected from the group consisting of a component of a window for an airplane, a train, a school, a high speed aircraft canopy, automotive headlamp assembly, automotive interior instrument panel, automotive bumper, automotive window glazing, a houseware item, a houseware power tool, a refillable water bottle, a refillable milk bottle, an electrical connector, telephone network device, outlet box, computer housing, business machine housing, instrument panel, membrane switch, insulator, protective goggles, safety glasses, safety sideshields, eyeglasses, mask, sports helmet, motorcycle helmet, and a safety helmet for firefighters or construction workers.

\* \* \* \* \*